United States Patent [19]

Miller

[11] Patent Number: 5,588,976

[45] Date of Patent: Dec. 31, 1996

[54] AIR FILTRATION MEDIA

[75] Inventor: Donald L. Miller, Defiance, Ohio

[73] Assignee: Schuller International, Inc., Denver, Colo.

[21] Appl. No.: 488,984

[22] Filed: Jun. 8, 1995

Related U.S. Application Data

[60] Division of Ser. No. 168,746, Dec. 16, 1993, Pat. No. 5,454,848, which is a continuation-in-part of Ser. No. 40,783, May 19, 1993, abandoned.

[51] Int. Cl.$^6$ .................................................. B01D 46/00
[52] U.S. Cl. .................................. 55/514; 55/524; 55/527
[58] Field of Search ............................ 55/524, 527, 514; 428/430, 435

[56] References Cited

U.S. PATENT DOCUMENTS

| | | | |
|---|---|---|---|
| 2,579,984 | 12/1951 | Trowbridge | 55/524 |
| 2,751,962 | 6/1956 | Drummond . | |
| 3,003,581 | 10/1961 | Greason | 55/524 |
| 3,594,993 | 7/1971 | Heyse | 55/524 |
| 3,972,694 | 8/1976 | Head | 55/524 |
| 4,765,812 | 8/1988 | Homonoff et al. | 55/524 |
| 4,917,714 | 4/1990 | Kinsley, Jr. | 55/524 |
| 5,389,121 | 2/1995 | Pfeffer | 55/524 |

*Primary Examiner*—C. Scott Bushey
*Attorney, Agent, or Firm*—Cornelius P. Quinn

[57] ABSTRACT

A fiber glass air filtration media includes a blanket of glass fibers with about 25% to 35% by weight of the glass fibers being fine glass fibers having an average diameter of less than 3.5 microns and about 65% to 75% by weight of the glass fibers being coarse glass fibers having an average diameter of more than 3.5 microns. The fine and coarse glass fibers are randomly intermingled throughout the blanket. The blanket is formed by producing the fine glass fibers on a first set of fiber generators and the coarse glass fibers on a second set of fiber generators. The fiber generators are laterally aligned across the width of and direct gaseous streams of the glass fibers at a moving collection surface where the blanket is formed. The fiber generators of the first set alternate with the fiber generators of the second set and the glass fibers produced by the two sets of fiber generators are mixed together before being deposited on the collection surface.

2 Claims, 2 Drawing Sheets

AIR FILTRATION MEDIA

This application is a division of application Ser. No. 08/168,746, filed Dec. 16, 1993, and now U.S. Pat. No. 5,454,848; which was a continuation-in-part of application Ser. No. 08/040,783, filed May 19, 1993 and now abandoned.

BACKGROUND OF THE INVENTION

This invention relates to fiber glass air filtration media and, in particular, to an improved fiber glass air filtration media formed from a blanket of fine and coarse glass fibers and the method of manufacturing the air filtration media.

Previously, fiber glass air filtration media have been formed from glass fiber blankets having glass fibers of a particular average fiber diameter designed to perform a particular air filtration task. As a result of the many differing air filtration requirements to be served in the market place, about twenty different air filtration media products were required to provide a complete product line. The need for about twenty different air filtration media products with differing average fiber diameters, required adjustments to the manufacturing process in order to produce the various products. The process adjustments or production change overs from one product to another produce scrap, require manpower, reduce output and thereby increase product costs.

SUMMARY OF THE INVENTION

The present invention solves many of the problems of the prior art by providing an air filtration media product that can perform the functions of and be substituted for many of the prior art air filtration media products. In fact, through the use of the air filtration media product of the present invention, the number of separate air filtration media products required for a complete product line was reduced from about twenty to about six. This greatly reduces the number of process change overs required to produce different air filtration media and results in cost savings by reducing scrap, reducing manpower requirements and increasing the productivity of the production line.

The present invention comprises an air filtration media which is a glass fiber blanket containing a mixture of fine and coarse glass fibers. The blanket contains about 25% to 35% by weight fine glass fibers having an average diameter of less than 3.5 microns and about 65% to 75% by weight coarse glass fibers having an average diameter of more than 3.5 microns. The coarse and fine fibers are randomly intermingled with each other and the resulting air filtration media product can not only be substituted for a large number of prior art air filtration media products, it performs better by increasing the dirt holding capacity of the air filtration media.

The fiber glass air filtration media blanket is formed by directing the gaseous streams of glass fibers from a plurality of laterally aligned and spaced apart glass fiber generators (normally 10 or 12) against a moving collection surface that moves in a direction normal to the laterally aligned glass fiber generators. The glass fiber generators are adjusted so that every other generator produces fine diameter glass fibers and the remaining generators produce coarse diameter glass fibers. The gaseous streams of glass fibers, coming from the separate glass fiber generators, are intermingled between the glass fiber generators and the moving collection surface to cause the fine and coarse glass fibers to become randomly intermixed in the blanket that is formed on the collection surface. A binder is sprayed onto the glass fibers in the gaseous streams and functions to bond the fibers together at their intersections within the blanket and to bond an air permeable backing to the blanket should the particular product being produced employ a backing.

Each glass fiber generator comprises a glass melting unit which issues a plurality of continuous glass strands or filaments and an attenuation burner which forms the continuous glass strands into the gaseous streams of glass fibers. The fiber diameter of the glass fibers produced by each glass fiber generator is controlled by adjusting the melt rate of the melting unit. The melt rate of the melting units is increased to make coarse fibers and reduced to make fine fibers.

BRIEF DESCRIPTION OF THE DRAWINGS

FIG. 3 is a schematic plan view of the apparatus used in the process of the present invention.

DETAILED DESCRIPTION OF THE PREFERRED EMBODIMENTS

Figure 1:
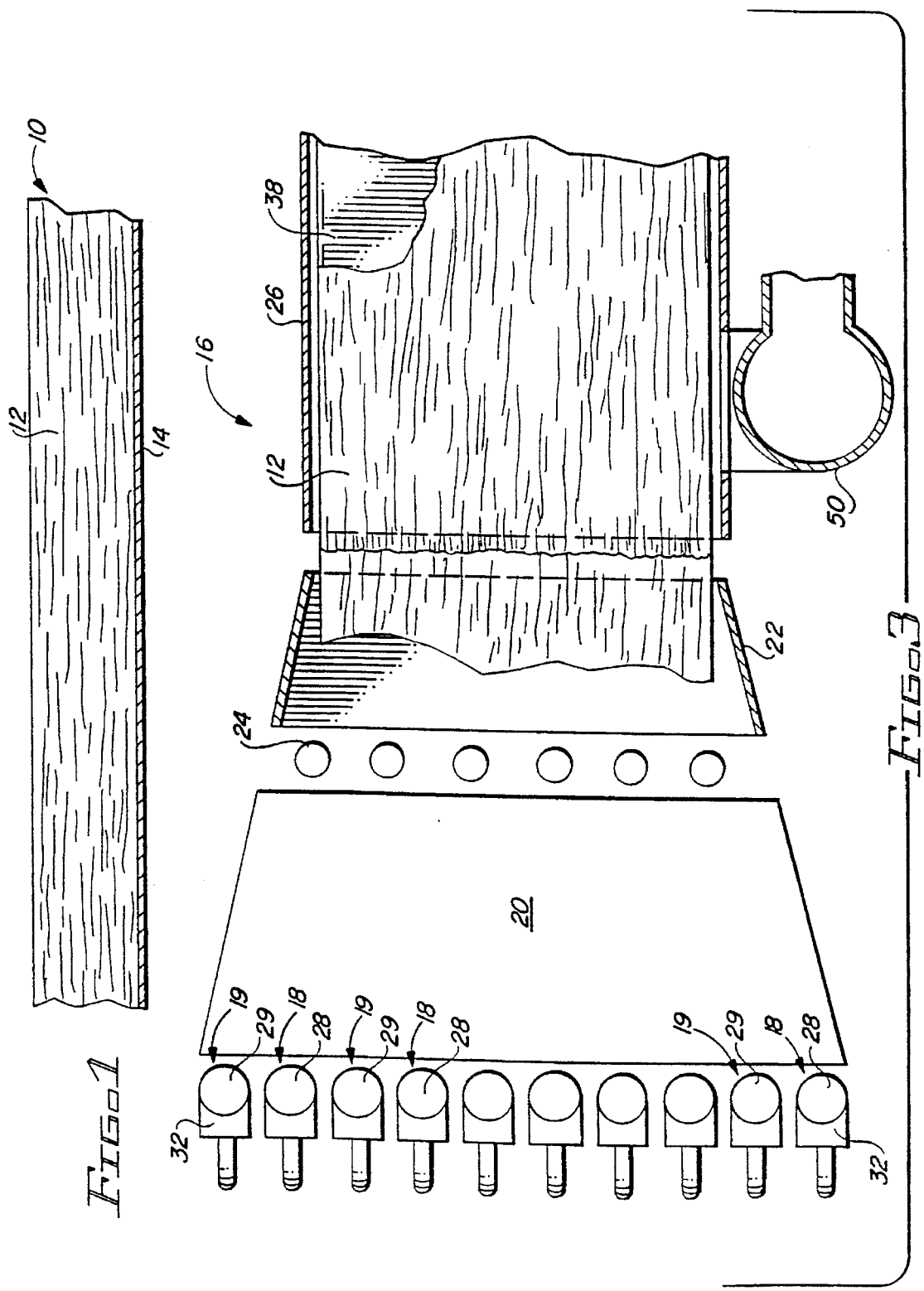
FIG. 1 is a sectional view of the fiber glass air filtration media of the present invention.

FIG. 1 shows the glass fiber air filtration media 10 of the present invention. The air filtration media comprises a fiber glass blanket 12 which is normally provided with a light weight spin bonded backing 14. The fiber glass blanket 12 is formed of a random intermixture of finite length, fine diameter and finite length, coarse diameter glass fibers. The fine glass fibers have an average fiber diameter of less than 3.5 microns and normally, have an average fiber diameter between 1 and 3 microns. In one embodiment, the fine glass fibers have an average fiber diameter of about 2 microns. The fine glass fibers comprise about 25% to 35% by weight of the glass fibers in the blanket 12. The coarse diameter glass fibers have an average diameter of more than 3.5 microns and normally, an average fiber diameter between 4 and 6.5 microns. In one embodiment where the fine glass fibers have an average fiber diameter of about 2 microns, the coarse glass fibers have an average fiber diameter of about 6 microns. The coarse glass fibers comprise about 65% to 75% by weight of the glass fibers in the blanket 12. The glass fibers are bonded together at their intersections by a resin binder that is sprayed on the glass fibers during the formation of the blanket 12. The glass fiber blanket is typically between 0.11 and 1.50 inches thick and has a density between about 0.4 and 1 pounds per cubic foot.

The glass fiber blanket 12 is normally provided with a commercially available air permeable light weight, spin bonded backing sheet 14. Two backing sheets which are used on the air filtration media of the present invention are the REEMAY, Style 2004, spin bonded polyester backing sheet and the CEREX, style 2304, Fiber Web, spin bonded nylon backing sheet. The fiber glass blanket 12 is adhesively bonded to the backing sheet 14 by the resin binder present in the fiber glass blanket.

Figure 2:
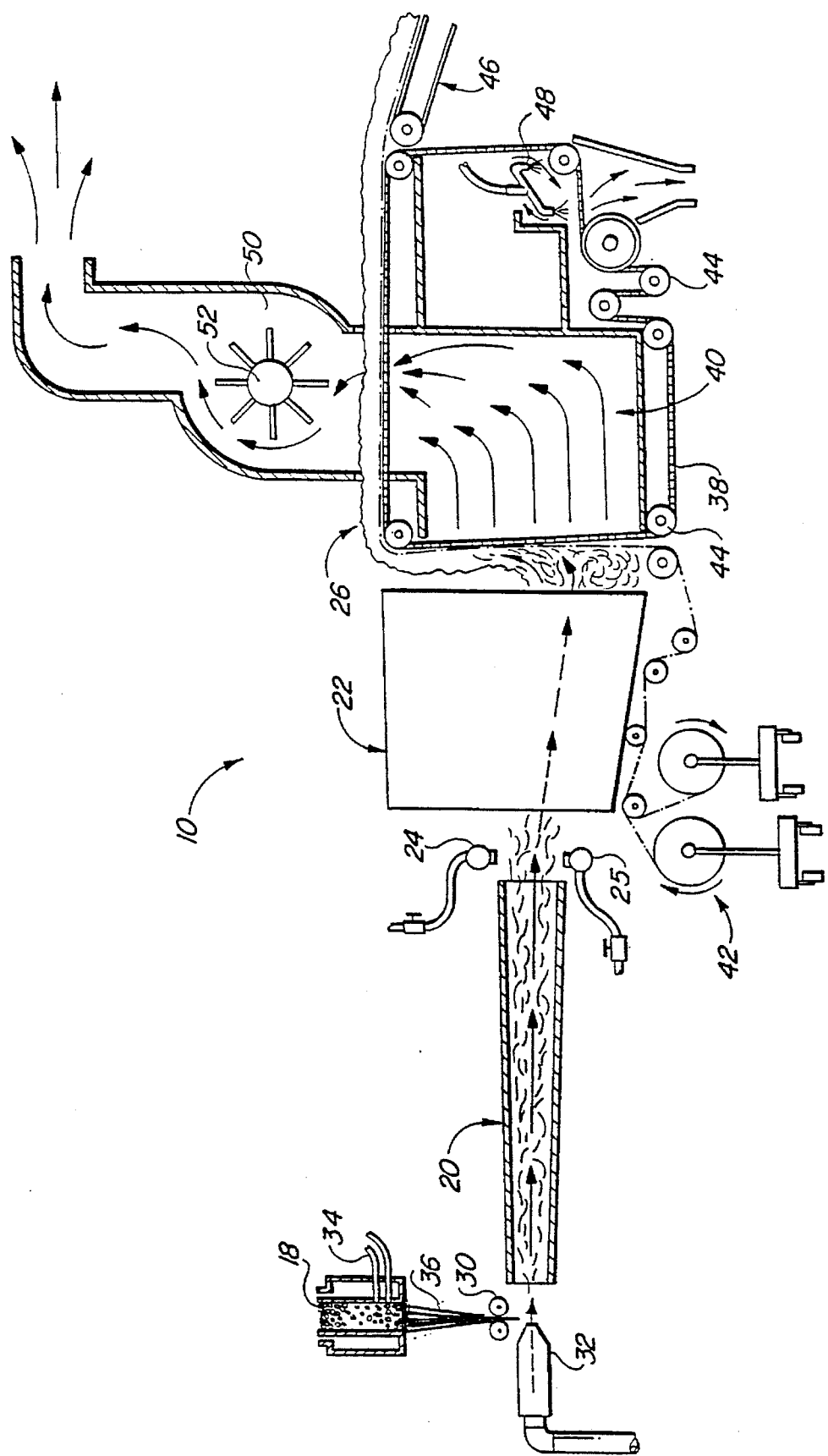
FIG. 2 is a schematic elevational view of the apparatus used in the process of the present invention.

FIGS. 2 and 3 show an apparatus 16 for manufacturing the glass fiber air filtration media 10 of the present invention. The apparatus comprises glass fiber generators 18 and 19, a forming tube 20 and U-chute 22, binder and water application spray nozzles 24 and 25, and a collection station 26. A conventional curing oven, not shown, is used to cure the resin binder in the air filtration media 10.

As best shown in FIG. 2, the glass fiber generators 18 and 19 are aligned across the width of the apparatus 16. While only ten glass fiber generators are shown, the number of glass fiber generators used can vary and it is also common to use twelve glass fiber generators.

The glass fiber generators 18 and 19 each comprise a glass marble melting pot 28 and 29, respectively, pull rollers 30 and burners 32. The melting pots 28 and 29 receive glass marbles from a hopper, not shown. Each melting pot accepts the glass marbles on a demand basis. As the marbles melt, more marbles automatically flow into the melting pot to keep the pot full. A source of high-temperature thermal energy, such as burners 34, heats and melts the glass marbles within each melting pot until the viscosity of the melted glass is such that it is extruded through holes in the bottom of the melting pot to form primary continuous strands or filaments 36. These primary continuous filaments 36 are pulled from the melting pots 28 and 29 by the pull rollers 30 and fed in front of the attenuation burners 32 where they are formed into gaseous streams of secondary fibers. The attenuation burners 32 are commercially available gas/oxygen burning SELAS burners.

The diameter of the primary continuous filaments 36 coming from each pot can be adjusted by the rate at which the glass is melted in the melting pot. The filaments 36 are issued or pulled by pull rollers 30 from each pot at essentially the same velocity for all throughputs. Thus, by increasing the input of thermal energy into a melting pot 28 or 29 and increasing the output of the melting pot larger diameter filaments 36 are produced. By reducing the input of thermal energy into a melting pot 28 and decreasing the output of the melting pot finer diameter filaments are produced.

The attenuation burners 32 direct hot gaseous blasts in a substantially horizontal direction that is perpendicular to the path of the continuous filaments 36 being fed in front of the burners. The hot gaseous blasts attenuate the filaments and form them into finite length or staple glass fibers which are carried by the hot gaseous blasts to the collection surface of the collection station 26.

The hot gaseous streams of glass fibers coming from the glass fiber generators 18 and 19 pass through the forming tube 20 and the U-chute 22 as the streams approach the collection station 26. Since the side walls of the forming tube 20 and the U-chute 22 converge in the direction of the collection station 26, the gaseous streams of glass fibers are intermingled thereby intermixing the fibers from the different glass fiber generators 18 and 19.

The binder application system, comprising binder spray nozzles 24 and water spray nozzles 25, is located intermediate the forming tube 20 and the U-chute 22. The headers for the spray nozzles 24 and 25 extend across the width of the apparatus 16 with the binder spray nozzles 24 being located above the gaseous streams of glass fibers and the water spray nozzles 25 being located below the gaseous streams of glass fibers. The nozzles 24 and 25 apply an atomized spray of resin binder and water, respectively, onto the glass fibers in the gaseous streams. The resin binder functions to bind the glass fibers together in the blanket 12 and to adhesively bond the blanket to the backing 14. The water spray functions to cool down the hot gaseous streams of glass fibers.

The collection station 26 comprises an endless, air permeable, chain mesh conveyor belt 38, a suction box 40 and a backing pay-off assembly 42. The chain mesh conveyor belt 38 passes over a series of guide rollers 44. The glass fibers are collected on the conveyor belt to form the blanket 12 as the chain mesh conveyor belt 38 passes in a substantially vertical direction, perpendicular to the direction of the gaseous streams of glass fibers. The gaseous streams of intermingled glass fibers impinge upon the conveyor belt 38 leaving the glass fibers on the conveyor belt to form the blanket 12 as the gases pass through the conveyor belt. After the blanket 12 has been formed, it is transferred to an oven conveyor 46 and the chain mesh collection belt 38 passes through a chain cleaner 48 prior to returning to the collection portion of its travel. The chain cleaner 48 sprays water through the collection belt to prevent a build-up of resin binder and glass fibers on the belt 38 which would inhibit the collection operation.

The suction box 40 draws air in through the conveyor belt 38 causing the fibers to be collected into the blanket 12 on the vertically moving surface of the conveyor belt 38. The air is exhausted through exhaust stack 50 by an exhaust or suction fan 52.

The pay off assembly 42 feeds the light weight spin bonded backing mats 14 onto the conveyor belt 38 as the belt begins its vertical collection run so that the glass fibers are actually collected on the backing mat 14 when a backing is used on the air filtration media 10. Two feed rolls are provided so that as one roll runs out another roll can be immediately introduced into the process.

As discussed above, the fiber glass air filtration media 10 is formed by directing the gaseous streams of glass fibers from the fiber generators 18 and 19 against the collection conveyor 38 of the collection assembly 26. Every other fiber generator 18 is set up to produce a fine diameter glass fiber and the remaining fiber generators 19 are set up to produce coarse diameter glass fiber. As the glass fibers pass through the forming tube 20 and the U-chute 22 the gaseous streams of glass fibers from the individual glass fiber generators intermingle causing the fine and coarse glass fibers to become randomly intermixed. Thus, the blanket of glass fibers 12 collected on the backing mat 14 or directly on the collection conveyor 38 comprises randomly intermixed fine and coarse glass fibers. The resin binder, applied by the spray nozzles 24, functions to bind the glass fibers together at their points of intersection and to adhesively bond the blanket 12 to the backing mat 14 when a backing mat is used. The blanket 12 passes from the collection conveyor 38 to the oven conveyor 46 which conveys the blanket to a conventional curing oven where the resin is cured and the thickness of the air filtration media product is set. The curing oven sandwiches the glass fiber blanket 12 between upper and lower chain mesh conveyor belts that are spaced apart a predetermined distance to form the blanket into an air filtration media product of a certain thickness. Thus, if it is desired to produce an air filtration media product 10 having a higher density, the collection conveyor 38 is slowed down to accumulate more glass fibers and form a thicker blanket 12. Conversely, if a less dense or lighter weight product is desired, the collection conveyor 38 is speeded up to accumulate less glass fibers and form a thinner glass fiber blanket 12.

As shown in FIG. 3, the fine diameter glass fibers are produced on fiber generators 18 and the coarse diameter glass fibers are produced on fiber generators 19. As mentioned above, the relative diameter (fine or coarse) of the glass fibers produced by a fiber generator 18 or 19 is governed principally by the pull rate or the output of the melting pot 28 or 29 associated with the fiber generator. Since the pull rollers 30 pull the continuous filaments 36 issuing from the melting pots 28 and 29 at a constant rate, the higher the output of a melting pot the larger the diameter of the continuous glass filaments produced. By way of example, a melting pot with 100 holes and a pull rate of about 10 pounds per hour, will produce glass fibers having an average diameter of about 2 microns and the same pot operated at a pull rate of about 29 pounds per hour, will produce fibers having an average diameter of about 6 microns. Thus by setting up every other melting pot 18 with a pull rate of about 10 pounds per hour and the remaining melting pots 19 with a pull rate of about 29 pounds per hour, a fiber glass blanket 12 is produced having about 25% to 35% by weight fine, 2 micron glass fibers and about 65% to 75% by weight coarse, 6 micron glass fibers.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A fiber glass air filtration media consisting essentially of: a blanket of glass fibers wherein about 25% to 35% by weight of the glass fibers are fine glass fibers having an average diameter between 1 and 3 microns and about 65% to 75% by weight of the glass fibers are coarse glass fibers having an average diameter between 4 and 6.5 microns, the fine glass fibers and the coarse glass fibers being randomly intermingled in the blanket, the fine glass fibers and the coarse glass fibers being adhesively bonded together in the blanket with a binder, the blanket having a thickness ranging from about 0.11 to about 1.50 inches, the blanket having a density between about 0.4 and about 1 pounds per cubic foot, and a porous, air permeable, backing mat adhesively bonded to one surface of the blanket by the binder.

2. The fiber glass filtration media of claim 1, wherein: the fine glass fibers have an average fiber diameter of about 2 microns and the coarse glass fibers have an average fiber diameter of about 6 microns.

\* \* \* \* \*